(12) United States Patent
Chiaramonte et al.

(10) Patent No.: US 10,323,458 B2
(45) Date of Patent: Jun. 18, 2019

(54) DUAL PRESSURE LOGIC FOR A TRACK DRILL CIRCUIT

(71) Applicant: Caterpillar Inc., Peoria, IL (US)

(72) Inventors: Michael P. Chiaramonte, Cary, NC (US); Christopher J. Demick, Howe, TX (US)

(73) Assignee: Caterpillar Inc., Deerfield, IL (US)

( * ) Notice: Subject to any disclaimer, the term of this patent is extended or adjusted under 35 U.S.C. 154(b) by 211 days.

(21) Appl. No.: 15/331,222

(22) Filed: Oct. 21, 2016

(65) Prior Publication Data

US 2018/0112467 A1    Apr. 26, 2018

(51) Int. Cl.
F15B 11/16    (2006.01)
E21B 7/02    (2006.01)
E02F 9/22    (2006.01)

(52) U.S. Cl.
CPC ............ *E21B 7/022* (2013.01); *E02F 9/2217* (2013.01); *E02F 9/2235* (2013.01); *E02F 9/2296* (2013.01); *F15B 11/165* (2013.01); *F15B 2211/20546* (2013.01); *F15B 2211/50518* (2013.01); *F15B 2211/5157* (2013.01); *F15B 2211/665* (2013.01); *F15B 2211/6653* (2013.01); *F15B 2211/6658* (2013.01); *Y02P 80/13* (2015.11)

(58) Field of Classification Search
CPC ........ B25F 5/005; E21B 7/022; F14B 11/162; F14B 11/165; F15B 11/162; F15B 11/165
USPC .......................................... 91/420, 422, 459
See application file for complete search history.

(56) References Cited

U.S. PATENT DOCUMENTS

| | | | |
|---|---|---|---|
| 5,315,826 A | 5/1994 | Hirata et al. | |
| 6,666,023 B2 | 12/2003 | Nagura et al. | |
| 6,874,318 B1 * | 4/2005 | MacLeod | F04B 49/08 60/451 |
| 9,133,605 B2 | 9/2015 | Pomeroy et al. | |
| 9,303,387 B2 | 4/2016 | Pfaff et al. | |
| 2012/0198832 A1 | 8/2012 | Fukumoto | |
| 2012/0285158 A1 | 11/2012 | Harlow et al. | |
| 2013/0280097 A1 | 10/2013 | Narotham | |
| 2014/0250877 A1 | 9/2014 | Bissbort et al. | |
| 2014/0271073 A1 | 9/2014 | Mueller | |
| 2016/0195083 A1 | 7/2016 | Lingenfelter et al. | |

FOREIGN PATENT DOCUMENTS

DE    102006022742 B4    3/2016

\* cited by examiner

*Primary Examiner* — F Daniel Lopez
*Assistant Examiner* — Daniel S Collins
(74) *Attorney, Agent, or Firm* — Miller, Matthias & Hull

(57) ABSTRACT

A hydraulic circuit may be used for controlling a plurality of hydraulic implements. The hydraulic circuit may include a first directional valve, a second directional valve, and a relief valve. A variable displacement pump may be fluidly coupled to the first directional valve, the second directional valve, and the relief valve. The hydraulic circuit may be communicably and operably coupled to a controller, and the controller may be programmed to selectably control the hydraulic circuit between a first operational mode and a second operational mode. Additionally, the controller may be programmed to actuate the first directional valve between an open position and a closed position and to actuate the second directional valve between a first open position, a second open position, a first closed position and a second closed position.

17 Claims, 4 Drawing Sheets

DUAL PRESSURE LOGIC FOR A TRACK DRILL CIRCUIT

FIELD OF THE DISCLOSURE

The present disclosure relates generally to a hydraulic circuit and, more particularly, to a hydraulic circuit and control system capable of switching between multiple operational modes.

BACKGROUND OF THE DISCLOSURE

Hydraulic circuits and control systems are incorporated into a host of machines and equipment, such as but not limited to, hauling machines, dump trucks, mining vehicles, on-highway vehicles, trains, motor graders, loaders, excavators, earth-moving vehicles, dozers, tractors, backhoes, agricultural equipment, material handling equipment, power generators, and the like. Moreover, the hydraulic circuits and control systems may be configured to distribute and control a supply of pressurized fluid which is circulated throughout the machine and utilized for performing one or more tasks. For example, the machine components such as, motors, actuators, tools, and other known devices may use the pressurized hydraulic fluid for the actuation, rotation, operation, or other action of machine components.

Furthermore, hydraulic circuits and control systems may rely on one or more pumps to circulate and distribute the pressurized fluid to the hydraulic components. In some cases, the machine may include multiple hydraulic components which require different pressure and flow rates of hydraulic fluid for performing the necessary actuation, rotation or other hydraulic functions. As a result, some hydraulic circuits and control systems configure the pumps to operate at one setting which circulates the hydraulic fluid at a fixed pressure. The hydraulic circuit and control system will then use a set of control valves and other components to regulate the flow and pressure of the hydraulic fluid needed by each of the different hydraulic components.

Hydraulic system configurations that provide hydraulic fluid at a fixed pressure may work well for machine implements and components such as but not limited to, a hammer, a drill, or other such oscillating implements because the constant pump pressure helps maintain stability of the hydraulic fluid pump during implement operation. Moreover, variable or load responsive hydraulic system configurations may work well for machine implements and components such as but not limited to, a tramming motor, and other known load responsive components because the use of the variable or load responsive flow and pressure may save power and energy that is otherwise wasted. However, variable or load responsive hydraulic systems may be more difficult to control, and therefore not well-suited for use with oscillating machine implements and components. In some cases, the oscillating nature of the machine implements may cause instability within the variable or load responsive hydraulic system and an unstable system may lead to premature wear of the system components and increased hydraulic noise.

Accordingly, a desire and need exists for improved control of hydraulic circuits and systems.

A hydraulic system with a pump that furnishes pressurized fluid to a supply node connected to a plurality of functions is disclosed in U.S. Pat. No. 9,303,387B2 (hereinafter the "'387 application"), entitled, "Hydraulic System with Open Loop Electrohydraulic Pressure Compensation." The hydraulic system of the '387 application includes a variable displacement pump that is configured to provide pressurized fluid to an outlet. The hydraulic system further includes a conventional load sense mechanism that is used to control the output of the variable displacement pump. Furthermore, a controller may be added to the hydraulic system for controlling the output of the pump. Moreover, the controller is configured open and close hydraulic system valves to proportionally control the flow of fluid during the hydraulic system operations. However, the electronic device of the '387 patent does not provide a control valve configuration which provides the capability of the hydraulic system to switch between a variable pump mode and a fixed pump mode. Furthermore, the electronic device of the '387 patent does not provide the ability to control the variable pump between multiple modes, with each mode capable of limiting and maintaining a different maximum pump pressure.

SUMMARY OF THE DISCLOSURE

In accordance with one embodiment, a hydraulic circuit having a variable hydraulic pressure is disclosed. The hydraulic circuit may include a reservoir which is configured to store a hydraulic fluid and a variable displacement pump being selectable between a first operational mode and a second operational mode, and the variable displacement pump is configured to pump the hydraulic fluid through a hydraulic fluid line. In some embodiments, the hydraulic circuit may further include a first hydraulic implement and a second hydraulic implement that is fluidly connected to the hydraulic fluid line, and the first hydraulic implement and the second hydraulic implement may be configured to receive the hydraulic fluid from the variable displacement pump. The hydraulic circuit may further include, a first directional valve coupled to the hydraulic fluid line, and the first directional valve may have an open position for fluidly connecting the first hydraulic implement and a relief valve to the variable displacement pump. Moreover, an output of the relief valve may be fluidly connected to a return line of the reservoir. The first directional valve may have a closed position for fluidly disconnecting the first hydraulic implement and the relief valve from the variable displacement pump. The hydraulic circuit may further include a second directional valve that is coupled to the hydraulic fluid line having a first open position for fluidly connecting the first hydraulic implement and a pump load sense line to the variable displacement pump. The second directional valve may have a first closed position for fluidly disconnecting the second hydraulic implement from the variable displacement pump, and a second open position for fluidly connecting the second hydraulic implement to the variable displacement pump. Finally, the hydraulic circuit may include a second closed position of the second directional valve for fluidly disconnecting the first hydraulic implement and the pump load sense line from the variable displacement pump.

In accordance with another embodiment, a hydraulic control system for controlling a plurality of hydraulic implements is disclosed. The hydraulic control system may include a hydraulic circuit having a first directional valve and a second directional valve. In some embodiments, the first directional valve may be fluidly coupled to a relief valve. The hydraulic control system may further include a variable displacement pump fluidly coupled to the first directional valve and the second directional valve. A first hydraulic implement and a second hydraulic implement may be configured to receive a hydraulic fluid that is pumped through a hydraulic fluid line by the variable displacement pump. The hydraulic control system may further include a controller that is operably and communicably coupled to the variable displacement pump, the first directional valve, and the second directional valve. The controller may be programmed to selectably control the variable displacement pump between a first operational mode and a second operational mode. Additionally, the controller may be programmed to actuate the first directional valve between an open position and a closed position and to actuate the second directional valve between a first open position, a second open position, a first closed position and a second closed position.

In accordance with another embodiment, a machine with the hydraulic circuit is disclosed. The machine may include a reservoir that is configured to store a hydraulic fluid and a variable displacement pump which is coupled to the reservoir. The variable displacement pump may be configured to be selectable between a first operational mode and a second operational mode and the variable displacement pump may be configured to pump the hydraulic fluid through a hydraulic fluid line of the hydraulic control system. The machine may further include a first hydraulic implement and a second hydraulic implement that is fluidly coupled to the variable displacement pump through the hydraulic fluid line, and the hydraulic fluid may be supplied by the variable displacement pump through the hydraulic fluid line for actuation of the first hydraulic implement and the second hydraulic implement. A first directional valve may be coupled to the hydraulic fluid line and the first directional valve may have an open position for fluidly connecting the first hydraulic implement and a relief valve to the variable displacement pump. Moreover, an output of the relief valve may be fluidly coupled to a return line of the reservoir. The first directional valve may have a closed position for fluidly disconnecting the first hydraulic implement and the relief valve from the variable displacement pump. The machine may further include a second directional valve coupled to the hydraulic fluid line having a first open position for fluidly connecting the first hydraulic implement and a pump load sense line to the variable displacement pump and a first closed position for fluidly disconnecting the second hydraulic implement from the variable displacement pump. The second directional valve may further include a second open position for fluidly connecting the second hydraulic implement to the variable displacement pump, and a second closed position for fluidly disconnecting the first hydraulic implement and the pump load sense line from the variable displacement pump. In some embodiments, the machine may further include a controller that is operably and communicably coupled to the variable displacement pump, the first directional valve, and the second directional valve. The controller may be programmed to selectably control the variable displacement pump between the first operational mode and the second operational mode. The controller may be further programmed to actuate the first directional valve between the open position and the closed position and to actuate the second directional valve between the first open position, the second open position, the first closed position and the second closed position.

These and other aspects and features will be more readily understood when reading the following detailed description in conjunction with the accompanying drawings.

DETAILED DESCRIPTION

Figure 1:
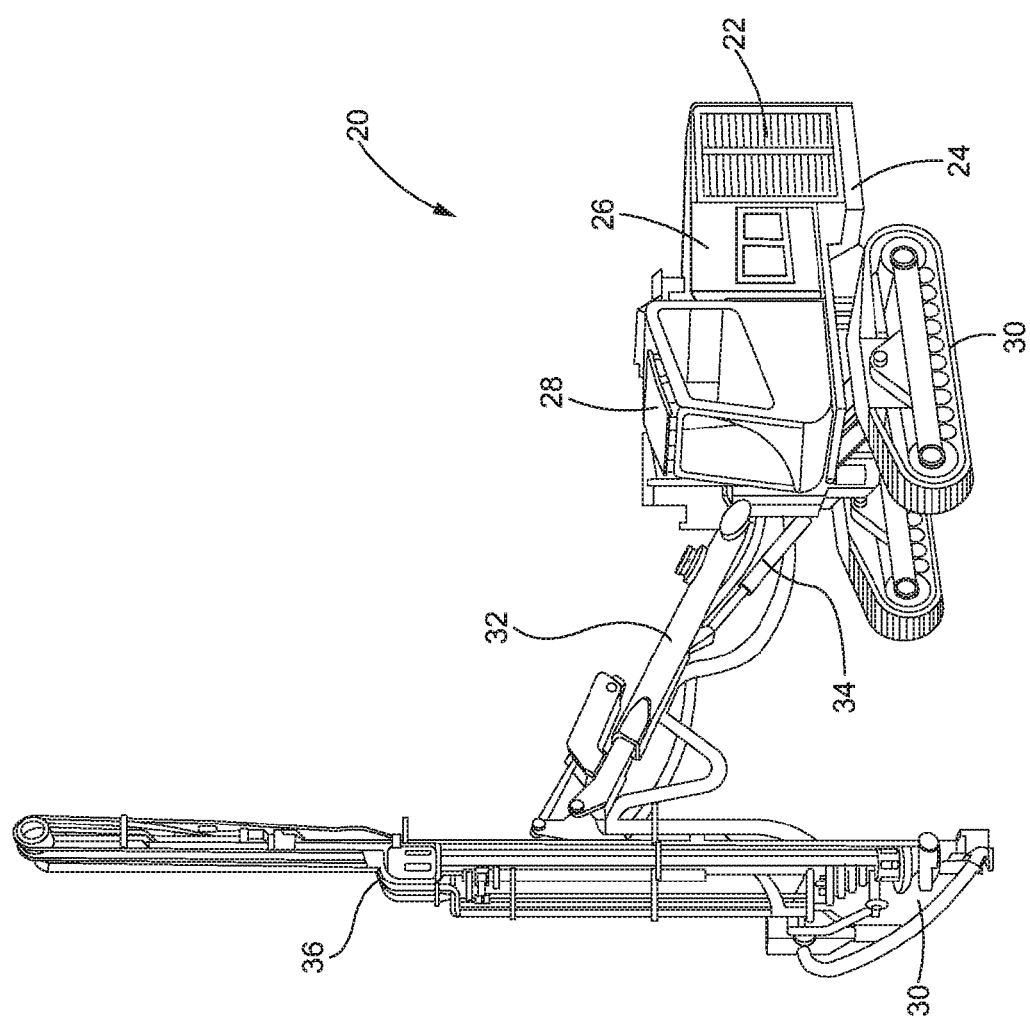
FIG. 1 is a perspective view of a machine, in accordance with one embodiment of the present disclosure.

Referring now to the drawings and with specific reference to FIG. 1, an exemplary embodiment of a machine constructed in accordance with the present disclosure is generally referred to by reference numeral 20. While the depicted example is illustrated as that of a track-type drilling machine, the machine 20 may be any piece of equipment such as but not limited to, an excavator, an off-road truck, an on-road truck, a bulldozer, a backhoe, a grader, a loader, or other known piece of equipment. Furthermore, the machine 20 may be configured with a power source 22, such as but not limited to an internal combustion engine, a diesel engine, a natural gas engine, a hybrid engine, or any such combination thereof. The power source 22 may be configured to supply power for the movement, locomotion, control, actuation, and other functions of the machine 20. Moreover, the machine 20 may further include a frame 24 and a body 26. The frame 24 may be configured to support the power source 22 and the body 26. Furthermore, the body 26 may surround and provide a protective enclosure for the power source 22 and other components of the machine 20. In some embodiments, the machine may further include a cab 28 that is also supported by the frame 24, and the cab 28 may be configured to provide an enclosed area for the operator to sit, stand, or otherwise reside while operating the machine 20. Moreover, the cab 28 may include a set of operational controls, and monitoring devices (not shown), such as but not limited to, a lever, pedal, steering wheel, joystick, button, dial, switch, monitor, gauge, or other such device which may be used by the operator while operating and controlling the machine 20. Additionally, the frame 24 and body 26 of the machine 20 may be supported by a plurality of ground engaging elements 30, such as tracks, wheels or other such elements, and the ground engaging elements 30 may be configured to tram, propel, drive, steer, or provide other types of movement of the machine 20.

Furthermore, the machine 20 may be configured with a boom 32 or other such attachment that is coupled to and extending away from the frame 24 of the machine 20. In some embodiments, the boom 32 may be movably coupled frame 24 or other portion of the machine 20 with one or more actuators 34, and the actuators 34 are configured to raise, lower or otherwise move the boom 32. In, one non-limiting example, the machine 20 may be equipped with an implement or tool 36 that is attached to the boom 32. The tool 36 may be a drill, as shown in FIG, 1, or other attachment, such as but not limited to, a bucket, an auger, a cutter, a hammer, a grapple, a fork, or other known tool. In some embodiments, more than one tool 36 may be mounted on the boom 32 or other location of the machine 20.

Additionally or alternatively, the boom 32 and the machine 20 may be configured to interchangeably accept a different implement or tool 36, as needed. Moreover, the boom 32 and one or more actuators 34 may be configured to provide the necessary support and actuation for the tool 36 to be able to complete the task at hand.

Figure 2:
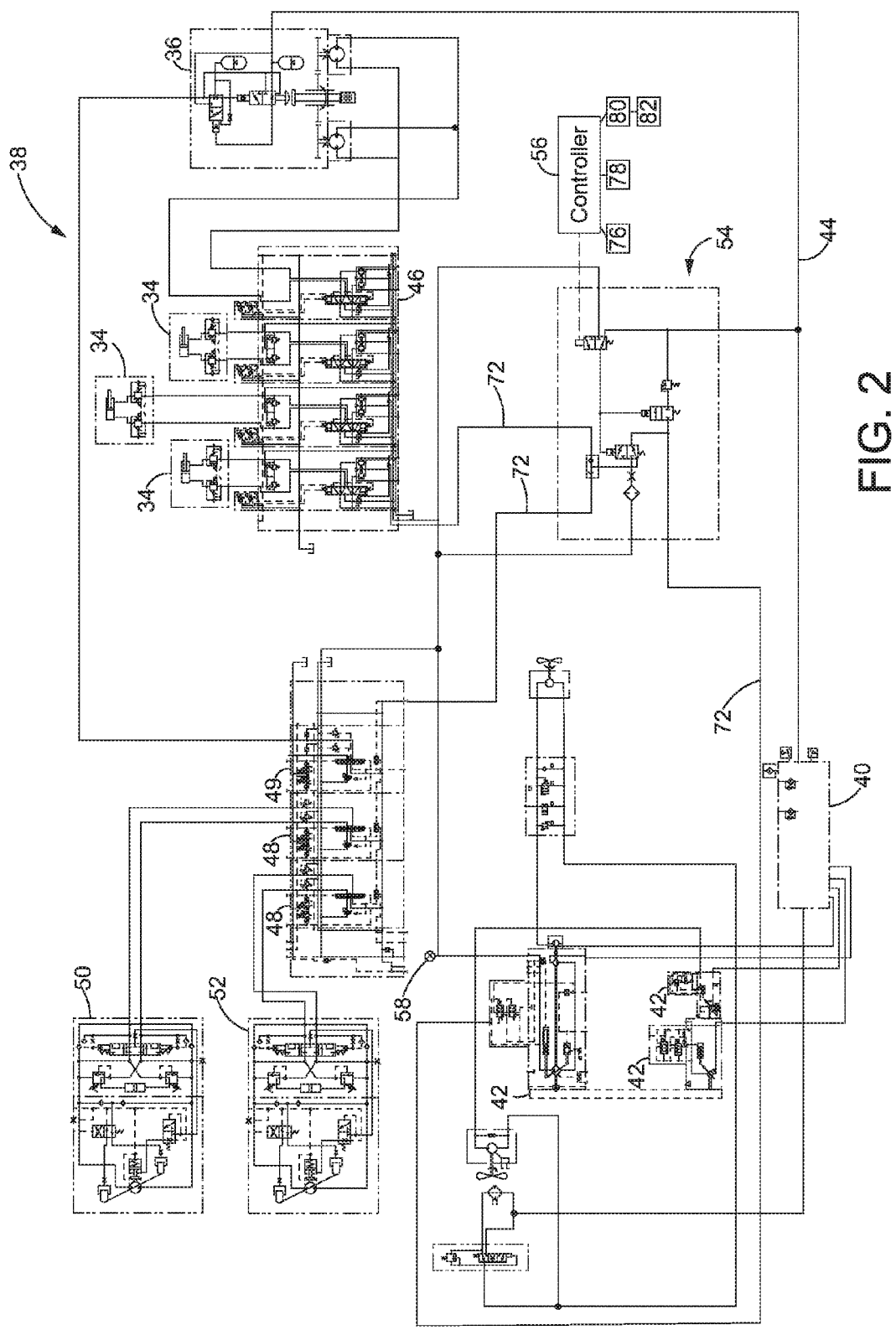
FIG. 2 is a schematic view of a hydraulic circuit incorporated into the machine of FIG. 1, in accordance with one embodiment of the present disclosure.

Referring now to FIG. 2, with continued reference to FIG. 1, one non-limiting example of a hydraulic control circuit 38 is shown in accordance with the present disclosure. The hydraulic control circuit 38 may be incorporated into the machine 20 and configured to provide operational control over certain functions of the machine 20, such as tramming (e.g., traveling or turning) of the machine 20, raising or lowering the boom 32, moving or actuating the tool 36, and/or other such movement or operation. The hydraulic control circuit 38 may be configured to control the flow rate and pressure of hydraulic fluid, and deliver hydraulic fluid to the one or more actuators 34, the tool 36, the first and second tram motors 50, 52, and other hydraulic components of the machine 20. In some embodiments, the hydraulic fluid is stored in a hydraulic fluid tank 40, which may be coupled to one or more variable displacement hydraulic fluid pumps 42. Furthermore, the one or more variable displacement pumps 42 may be configured such that the pump displacement is adjustable in order to control the output of the pump as needed to complete a specific task. The one or more variable displacement pumps 42 may be fluidly coupled to a hydraulic fluid line 44, and the one or more variable displacement pumps 42 and the hydraulic fluid line 44 may be configured to transport hydraulic fluid from the hydraulic fluid tank 40 through the hydraulic control circuit 38, and supply hydraulic fluid to the one or more actuators 34, the tool 36, the first and second tram motors 50, 52 and other hydraulic components of the machine 20.

In one embodiment of the hydraulic control circuit 38, at least one of the variable displacement pumps 42 may be configured to transport hydraulic fluid through the hydraulic fluid line 44 from the hydraulic fluid tank 40 to a boom valve 46, or other such component, which may be configured to control the supply of hydraulic fluid to the one or more actuators 34 that provide actuation or other movement of the boom 32. Furthermore, the boom valve 46 may be configured to selectively control the delivery of hydraulic fluid to one or more of the actuators 34 that are coupled to the boom 32. In some embodiments, the selective control of the boom valve 46 may direct the hydraulic fluid to the one or more actuators 34 in a manner that causes the actuators 34 to extend or retract such that the boom 32 is raised, lowered, or otherwise adjusted. Additionally or alternatively, the boom valve 46 may direct the hydraulic fluid to the one or more actuators 34 to swing, extend, retract, or perform other actuation and movement of the boom 32 as needed.

Additionally, the hydraulic control circuit 38 may include at least one tram valve 48 and at least one hammer valve 49. In some embodiments, the at least one tram valve 48 and the at least one hammer valve 49 may be configured to direct the flow of hydraulic fluid supplied by the variable displacement pumps 42 as needed based on the directed application of the hydraulic control circuit 38. For example, the tram valve 48 may be activated when the machine 20 operates in a variable pressure or load sense mode and the tram valve 48 may be configured to control hydraulic fluid delivery to a first tram motor 50 and a second tram motor 52. However, an alternative number of tram motors 50, 52 may be used. The first and second tram motors 50, 52 may be coupled to the ground engaging elements 30 of the machine 20, and the first and second tram motors 50, 52 may provide the necessary power to the ground engaging elements 30 in order to propel, turn, or otherwise maneuver the machine 20 in a direction of travel. In one non-limiting example, the tram valve 48 may direct hydraulic fluid to both the first and second tram motors 50, 52 such that power is delivered by the first and second tram motors 50, 52 to the ground engaging elements 30 for tramming (e.g., traveling or turning) or otherwise propelling the machine 20 in a direction of travel. Moreover, the tram valve 48 may be configured to control the delivery of hydraulic fluid to the first and second tram motors 50, 52 such that the ground engaging elements 30 cause the machine 20 to turn. In some cases, the tram valve 48 may deliver different flow rates of hydraulic fluid to the first and second tram motors 50, 52, to allow the machine 20 to turn, or otherwise be maneuvered around the job site.

The hammer valve 49 may be further configured to control hydraulic fluid delivery to the tool 36 that is mounted on or otherwise attached to the boom 32 of the machine 20. In some embodiments, the hammer valve 49 may be activated when the machine 20 operates in a fixed pressure mode. When the variable displacement pump 42 is in the fixed pressure mode the implement valves such as but not limited to, the hammer valve 49 and the tram valve 49 regulate the flow to the actuators and tool 36 to perform the desired function or operation. Moreover, the hammer valve 49 and the tram valve 48 may each be configured such that hydraulic fluid is capable of being simultaneously delivered to the first and second tram motors 50, 52 and the boom 32. This may allow tramming or other maneuvering of the machine 20 while the boom 32 is positioning the tool 36 in preparation to carry out the designated task. Additionally, the hammer valve 49 and the tram valve 48 may restrict simultaneous delivery of hydraulic fluid to the first and second tram motors 50, 52 and the tool 36. As a result, in some embodiments, when the tool 36 is activated, the machine 20 may be kept in a stationary position by restricting hydraulic fluid from being delivered to the first and second tram motors 50, 52. Conversely, in alternative embodiments, when the first and/or second tram motors 50, 52 are activated the tool 36 may be restricted from being used such that the tool 36 cannot be activated while the machine 20 is moving in a direction of travel.

In some embodiments, different hydraulic fluid pressures and flow rates may be needed between actuation of the first and second tram motors 50, 52 and actuation of the tool 36. As a result, the hydraulic control circuit 38 may incorporate a logic circuit 54 that is configured to assist in the control and delivery of hydraulic fluid to the tram valve 48, the boom valve 46, the tool 36 and/or other components coupled to the hydraulic control circuit 38 of the machine 20. In one non-limiting example, the logic circuit 54 receives hydraulic fluid supplied from the hydraulic fluid tank 40 by at least one of the variable displacement pumps 42. Moreover, the logic circuit 54, and other portions of the hydraulic control circuit 38, may be operationally coupled to a controller 56 which is programmed to control the logic circuit 54, the hydraulic control circuit 38, the one or more variable displacement pumps 42, and other systems and components of the machine 20. The logic circuit 54 may be further configured with the capability to switch between a plurality of operational modes of the machine 20. In one non-limiting example, the controller 56 may be programmed to automatically control, activate, and/or deactivate the logic circuit 54, the hydraulic control circuit 38, and other systems and components of the machine 20. In some embodiments, one or more sensors 58, such as but not limited to, a flow sensor, a pressure sensor, or any other known sensor or combination of sensors, may be incorporated into the hydraulic control circuit 38 and logic circuit 54. The one or more sensors 58 may be configured to monitor operational parameters of the hydraulic control circuit 38, logic circuit 54, and other systems of the machine 20, and the one or more sensors 58 may be communicably coupled to the controller 56 such that data collected by the one or more sensors 58 is received and utilized by the controller 56 to automatically control, activate, and/or deactivate the hydraulic control circuit 38, the logic circuit 54, and other systems and components of the machine 20. Alternatively, in some embodiments, an operator of the machine 20 may use the controller 56 to manually input commands to activate, deactivate and otherwise control the hydraulic control circuit 38, the logic circuit and other systems and components of the machine 20 in order to direct the machine 20 according to complete the desired task or function.

Figure 3:
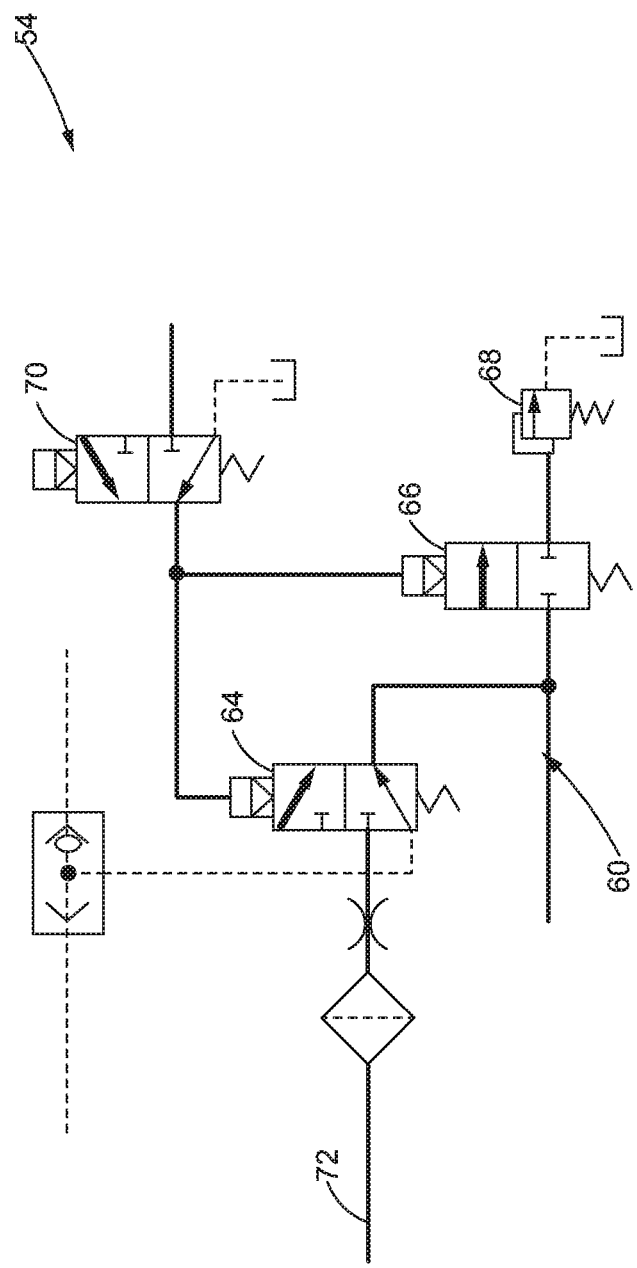
FIG. 3 is a schematic view of a portion of the hydraulic circuit of FIG. 2, in accordance with one embodiment of the present disclosure.
Figure 4:
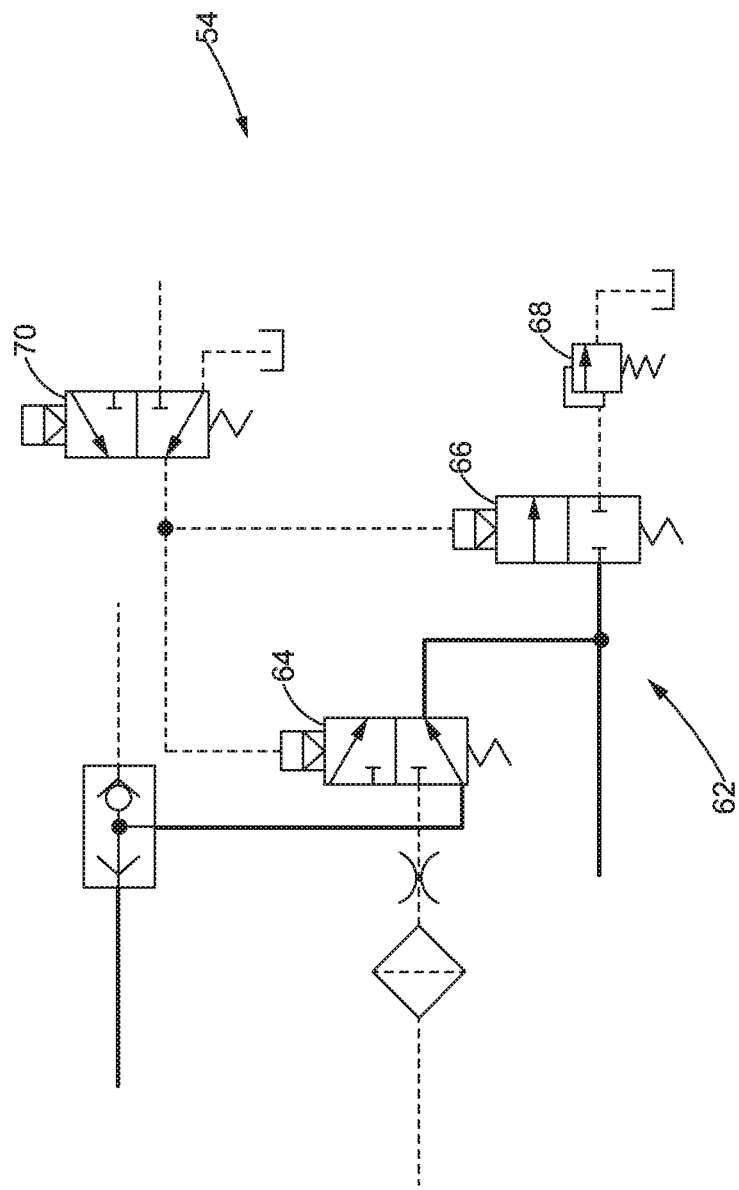
FIG. 4 is a schematic view of a portion of the hydraulic circuit of FIG. 2, in accordance with another embodiment of the present disclosure; and While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

Referring to FIGS. 3-4, and with continued reference to FIGS. 1-2, a schematic of an exemplary logic circuit 54 is illustrated. In some embodiments, the logic circuit 54 may be incorporated into the hydraulic control circuit 38 to provide the ability to switch between a first operational mode, or pressure compensated mode 60, and a second operational mode, or load sense mode 62. In order to provide switching capability between the pressure compensated mode 60 and the load sense mode 62, the logic circuit 54 may include a load sense control valve 64, a pressure compensated control valve 66, a relief valve 68, and a pressure compensated selector solenoid valve 70. However, other components may be included in the logic circuit 54. Furthermore, the pressure compensated selector solenoid valve 70 or other such component of the hydraulic control circuit 38 may be operatively coupled to the controller 56 in order to control the logic circuit 54. In some embodiments, the controller 56 may activate and/or deactivate the pressure compensated selector solenoid valve 70 in order to switch the hydraulic control circuit 38 between the pressure compensated mode 60, the load sense mode 62, and/or other operational mode.

For example, the load sense control valve 64 may be configured to receive a signal from the controller 54 based on input from the operator of the work machine 20 to switch the logic circuit 54 between the pressure compensated mode 60 and the load sense mode 62. In the pressure compensated mode 60 the pressure compensated selector solenoid valve 70 may be energized such that the pressure from the variable displacement pump 42 or other pressure such as a pilot pressure, is directed towards the pressure compensated control valve 66 and the pressure compensated control valve 66 may be further configured to selectively bring the relief valve 68 online. In some embodiments, when the logic circuit 54 is selected to operate in the pressure compensated mode 60 the relief valve 68 acts to limit the pressure such that a consistent pressure is provided to the hammer valve 49 and the boom valve 46. The hammer valve 49 and the boom valve 46 may then be configured to regulate the pressure and flow to match the operator desired command. Alternatively, in the load sense mode 62 the pressure compensated selector solenoid valve 70 may be de-energized such that the load sense is directed through the load sense control valve 64 to the variable displacement pump 42. As a result, the load sense may signal the variable displacement pump 42 to increase or decrease the flow depending on the pressure requirements of the tram motors 50, 52 or other component of the machine 20.

Referring to FIG. 3 and with continued reference to FIGS. 1-2, an exemplary embodiment of the logic circuit 54 in the pressure compensated mode 60 is shown. As shown therein, the hydraulic control circuit 38 and the logic circuit 54 may operate in the pressure compensated mode 60 when the tool 36 of the machine 20 is activated. In the pressure compensated mode 60, the logic circuit 54 operates at least one of the variable displacement pumps 42 in a lower, fixed pressure setting in order to deliver a fixed hydraulic fluid flow rate and pressure that may be required by the tool 36. When the logic circuit 54 is in the pressure compensated mode 60, the pressure compensated control valve 66 is placed into an open position such that hydraulic fluid delivered by at least one of the variable displacement pumps 42 is directed to the tool 36 of the machine. Moreover, the pressure compensated control valve 66 is adjusted to fluidly connect at least one of the variable displacement pumps 42 to the relief valve 68. In some embodiments, the relief valve 68 is fluidly connected to a return line that directs hydraulic fluid back towards the hydraulic fluid tank 40. Furthermore, the relief valve 68 prevents the flow rate and pressure from going any higher and as a result, the load sense mode 62 of the logic circuit 54 is configured to regulate the hydraulic fluid flow and to maintain the hydraulic fluid pressure needed to properly operate the tool 36.

When the logic circuit 54 is placed in the pressure compensated mode 60 the pressure compensated selector solenoid valve 70 may be activated such that hydraulic fluid with a controlled pressure is supplied to actuate the tool 36. Moreover, when the logic circuit 54 is placed in the pressure compensated mode 60 the load sense control valve 64 may be actuated in an open position such that some hydraulic fluid supplied from at least one of the variable displacement pumps 42 is directed through the load sense control valve 64 and into a load sense line 72. In some embodiments, the load sense line 72 travels from the logic circuit 54 to a load sense port (not shown) on the variable displacement pump 42. The load sense line 72 may provide a load sense hydraulic signal which is received by the variable displacement pump 42. Moreover, the variable displacement pump 42 may be configured to increase or decrease the flow rate based on the load sense hydraulic signal such that the margin setting of the variable displacement pump 42 is maintained Referring to FIG. 4 and continued reference to FIGS. 1-2, one non-limiting example of the logic circuit 54 configured to operate in the load sense mode 62 is provided. The logic circuit 54 may instruct the hydraulic control circuit 38 to activate the load sense mode 62 when the machine 20 is operated in the tramming mode. In some embodiments, the load sense mode 62 of the logic circuit 54 is capable of supplying a higher, load responsive hydraulic fluid pressure to actuate the first and second tram motors 50, 52. The load sense mode 62 of the logic circuit 54 may be configured to control the pressure supplied by at least one of the variable displacement pumps 42 based on the load-induced pressure sensed upstream from the load sense control valve 64. Furthermore, in one non-limiting example, when the logic circuit 54 is placed in the load sense mode 62, the boom valve 46, tram valve 48, hammer valve 49 or other such valve, may produce the load sense signal which is received by the load sense control valve 64 and directed through the load sense line 72 to the variable displacement pump 42. In some embodiments, the load sense signal may instruct the variable displacement pump 42 to increase or decrease flow based on the received load sense signal.

During tramming of the machine 20, hydraulic fluid may flow through the hydraulic control circuit 38 and be supplied to the first and second tram motors 50, 52. The supply of hydraulic fluid may actuate the first and second tram motors 50, 52 such that the first and second tram motors 50, 52 generate the necessary power to propel the ground engaging elements 30. In some cases, the operator of the machine 20 may want to adjust the speed or cause the machine 20 to turn. As a result, the increase or decrease in speed, or maneuvering of the machine 20, may cause a corresponding increase or decrease in the hydraulic load produced by the first and second tram motors 50, 52. Moreover, in the load sense mode 62, at least one of the variable displacement pumps 42 may operate in a variable pressure mode such that the output of at least one of the variable displacement pumps 42 is adjustable based on the sensed load created by the activation of the first and second tram motors 50, 52 or other hydraulic component. For example, in the load sense mode 62, if the load produced by the first and second tram motors 50, 52 increases, then the pressure of hydraulic fluid supplied by at least one of the variable displacement pumps 42 may be increased a corresponding amount in order to produce the desired or commanded flow of hydraulic fluid being supplied to the first and second tram motors 50, 52. Conversely, if the load produced by the first and second tram motors 50, 52 decreases, the pressure of hydraulic fluid supplied by at least one of the variable displacement pumps 42 may be adjusted (i.e., decreased) a corresponding amount to match the load produced by meeting the desired flow to the first and second tram motors 50, 52. Similarly, the flow of hydraulic fluid delivered to the first and second tram motors 50, 52 may be variable based on the demand and operating load of the first and second tram motors 50, 52.

Further shown in FIG. 4 with continued reference to FIGS. 1-2, the load sense control valve 64 may be a multi-position control valve and when the logic circuit 54 is placed in the load sense mode 62 the controller 56 sends a signal to the logic circuit 54 which may de-activate the pressure compensated selector solenoid valve 70. In some embodiments, the logic circuit 54 may be configured such that the load sense mode 62 is the default mode of the logic circuit 54. As a result, when the logic circuit 54 is selected to operate in the load sense mode 62 the controller 56 may be configured to supply zero current or other such control signal to the pressure compensated selector solenoid valve 70. For example, when the logic circuit 54 is selected in the load sense mode 62 the pressure compensated selector solenoid valve 70 may be de-energized such that the pilot pressure or discharge pressure from the variable displacement pump 42 is diverted from acting on the load sense control valve 64. As a result, in the load sense mode 62 the boom valve 46, the tram valve 48 or other such valve, may direct the load sense signal through the load sense control valve 64 to the load sense line 72. Moreover, the load sense signal may be received by the variable displacement pump 42 which signals the variable displacement pump 42 to increase or decrease the flow depending on the desired or commanded flow requirements of the tram motors 50, 52, or other hydraulic components of the machine 20.

Referring back to FIG. 2, the controller 56 may be utilized by an operator of the machine 20 to control certain movements and actions, such as but not limited to, tramming (travelling or turning), manipulating the boom 32, actuating the tool 36, or other operations or functions. In some embodiments, the controller 56 may be configured with central processing unit 76 (CPU), an input/output device 78, and a memory device 80. In some embodiments, the memory device 80 may store software 82 or control logic that includes a set of programmed instructions to be executed by the CPU 76 of the controller 56. Moreover, the software 82 stored in the memory device 80 may be programmed to provide a set of control instructions for the hydraulic circuit 38, the logic circuit 54 and other systems and components of the machine 20. Additionally, the controller 56 may be coupled to an input/output device 78 and located in the cab 28 such that the operator of the machine 20 can access the controller 56. In some embodiments, the input/output device 78 may allow the operator to enter control commands and other instructions through a keyboard, mouse, dial, button, touch screen, microphone, or other known input mechanism. Furthermore, data and other information produced by the controller 56 may be output to the operator through a monitor, speaker, printer, or other known output device.

The controller 56 may be operably and communicably coupled to the hydraulic control circuit 38 and the logic circuit 54 and the controller 56 may be used to control, direct and command operation of the hydraulic control circuit 38 and the logic circuit 54. Moreover, the software 82 may provide control logic used by the controller 56 to control the hydraulic control circuit 38 and the logic circuit 54. Additionally, the controller 56 may use data that is received from the one or more sensors 58, the load sense line 72 or any other signals, commands, and information related to the hydraulic control circuit 38 and logic circuit 54. In some embodiments, this data received from the one or more sensors 58 and load sense line 72 is stored in the memory device 80 for later use. The CPU 76 may access the stored data from the memory device 80 and perform calculations or other such functions that may be used to update or adjust the control logic of the software 82. In one non-limiting example, the controller 56 may send signals to the hydraulic control circuit and the logic circuit 54 in order to switch between the pressure compensated mode 60 and the load sense mode 62 of the logic circuit.

INDUSTRIAL APPLICABILITY

In general, the foregoing disclosure finds utility in various industrial applications, such as but not limited to, the control and actuation of hydraulic implements and components. Moreover, the hydraulic circuit and control system may be incorporated into machines and equipment used in mining, construction, industrial, earthmoving, agricultural, forestry and other such applications. In particular, the disclosed hydraulic control circuit and control system may be applied to track-type machines, hauling machines, dump trucks, mining vehicles, on-highway vehicles, trains, motor graders, loaders, excavators, earth-moving vehicles, dozers, tractors, backhoes, agricultural equipment, material handling equipment, power generators, and the like.

Furthermore, the hydraulic control circuit 38 of the present disclosure may be used to control, actuate, and operate a plurality of hydraulic components of the machine 20, such as but not limited to, a tool 36, one or more actuators 34, a boom 32, first and second tram motors 50, 52, and other such hydraulic components and systems. In some embodiments, one or more variable displacement pumps 42 may be coupled with the hydraulic control circuit 38 to pump, or otherwise circulate, hydraulic fluid throughout the hydraulic system of the machine 20. Furthermore, in some embodiments of the present disclosure, the hydraulic control circuit 38 may include a logic circuit 54 that is configured to allow the machine 20 to switch between a plurality of hydraulic operational modes. For example, the logic circuit 54 may include a load sense control valve 64, a pressure compensated control valve 66, a relief valve 68, a pressure compensated selector solenoid valve 70 and other such components. Moreover, the hydraulic control circuit 38 and the logic circuit 54 may be coupled to a controller 56 that provides a control signal to the hydraulic control circuit 38 and the logic circuit 54 which may instruct the hydraulic control circuit 38 to switch between operating in a pressure compensated mode 60, a load sense mode 62 or other specified mode.

In one non-limiting example, the pressure compensated mode 60 of the hydraulic control circuit 38 may be activated when the machine 20 is operating the tool 36, where the tool 36 may be a drill/hammer, or other such tool attached to the machine 20. In some embodiments, the tool 36 may be a hydraulically actuated drill/hammer attachment, or other such attachment that is oscillatory in nature. As a result, operation of the hydraulic control circuit 38 in the pressure compensated mode 60 may set the one or more variable displacement pumps 42 to a pre-determined fixed fluid pressure output that is needed to operate the tool 36. Moreover, in the pressure compensated mode 60 the hydraulic circuit 38 and logic circuit 54 may adjust (i.e., open and close) the pressure compensated control valve 66 to direct the flow of hydraulic fluid to the tool 36 and a relief valve 68. In some embodiments, the relief valve 68 may specifically be chosen to prevent the pressure of hydraulic fluid from going higher than the pre-determined value needed for proper actuation of the tool 36. As a result, when the hydraulic control circuit 38 is operated in the pressure compensated mode 60 an uninterrupted flow of hydraulic fluid is delivered for the proper operation of the tool 36. Furthermore, in the pressure compensated mode 60 the variable displacement pump 42 is maintained at a constant pressure and the hydraulic fluid flow may be constant or variable, depending on the control of the boom valve 46 and the hammer valve 49. Maintaining constant pressure to the boom valve 46 and the hammer valve 49 may help improve system stability.

This may be contrasted to the load sense mode 62, which may be activated when the machine 20 is operating in a tramming (travelling/turning) mode. When the load sense mode 62 of the hydraulic control circuit is selected it may set the one or more variable displacement pumps 42 to a higher, load responsive pump pressure that is supplied to actuate the first and second tram motors 50, 52, one or more actuators 34, and other load sensing hydraulic components. In some embodiments, operation of the hydraulic control circuit 38 in the load sense mode 62 may set the one or more variable displacement pumps 42 into a variable pressure mode where the pump output is adjusted based upon a pressure drop that is monitored across the load sense control valve 64, or other orifice. As such, the pump output of the one or more variable displacement pumps 42 uses the sensed load feedback to adjust the pump output when the hydraulic load of the first and second tram motors 50, 52, or other hydraulic component, increases or decreases.

The hydraulic control circuit 38 and logic circuit 54 may provide several advantages to other hydraulic systems that are in use. In a typical hydraulic system, when the hydraulic circuit is active, the hydraulic pumps are set to run at the maximum output, or at the maximum pressure compensated limit. The hydraulic pumps may be configured to output the maximum pressure compensated limit of 220 bar and the hydraulic system will then use control valves, relief valves, and other components to regulate the flow and pressure of hydraulic fluid as it circulates through the hydraulic system and is supplied to the various hydraulic components. Conversely, as discussed in the present disclosure, the hydraulic control circuit 38 and the logic circuit 54 are configured to include the ability to switch between the pressure compensated mode 60 and the load sense mode 62. As a result, the hydraulic control circuit 38 is capable of operating at two discreet operating pressure limits. For example, the tram system or locomotion system of the machine 20 may require a pressure of 345 bar to meet the torque requirements of the tram motors 50, 52. Conversely, the tool 36 such as but not limited to, a hammer, may need to operate at a lower pressure limit such as 210 bar.

The hydraulic control circuit 38 and the logic circuit 54, of the present disclosure, provide distinct maximum pressures that are supplied to the tool 36, the first and second tram motors 50, 52, and other hydraulic components. The ability to switch between the pressure compensated mode 60 and the load sense mode 62 may provide a significant amount of power consumption savings by operating the first and second tram motors 50, 52 in the load sense mode 62. Additionally, the load sense mode 62 may provide improved desired tramming performance by allowing for better turning of the machine 20 and increased tramming speed. Furthermore, the use of the load sense mode 62 while the machine 20 is tramming may decrease the excess heat generated in the hydraulic control circuit 38 and help extend the lifetime of the hydraulic fluid.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A hydraulic circuit having a variable hydraulic pressure, the hydraulic circuit comprising:
   a reservoir configured to store a hydraulic fluid;
   a variable displacement pump being selectable between a first operational mode and a second operational mode, and the variable displacement pump configured to pump the hydraulic fluid through a hydraulic fluid line;
   a first hydraulic implement and a second hydraulic implement fluidly connected to the hydraulic fluid line and the first hydraulic implement and the second hydraulic implement configured to receive the hydraulic fluid from the variable displacement pump;
   a pressure compensated selector solenoid valve coupled to the hydraulic fluid line;
   a pressure compensated control valve coupled to the hydraulic fluid line, the pressure compensated control valve having an open positon for fluidly connecting the first hydraulic implement and a relief valve to the variable displacement pump, an output of the relief valve being fluidly connected to a return line of the reservoir, and the pressure compensated control valve having a closed position for fluidly isolating the relief valve from the variable displacement pump, wherein the open position of the pressure compensated control valve activates the first operational mode of the variable displacement pump.

2. The hydraulic circuit of claim 1, wherein the first operational mode is a pressure compensated mode that operates the variable displacement pump at a fixed pressure setting, and the relief valve is configured to maintain a pre-determined pressure of the hydraulic fluid to actuate the first hydraulic implement such that the variable displacement pump supplies a constant pressure to the first hydraulic implement.

3. The hydraulic circuit of claim 1, wherein the first hydraulic implement is a hydraulic actuated drill.

4. The hydraulic circuit of claim 1, wherein the closed position of the pressure compensated control valve activates the second operational mode of the variable displacement pump.

5. The hydraulic circuit of claim 4, wherein the second operational mode is a load sense mode, and the load sense mode comprises an adjustable pressure output of the variable displacement pump based on a sensed load of the second hydraulic implement.

6. The hydraulic circuit of claim 5, wherein the second hydraulic implement includes at least one tram motor.

7. The hydraulic circuit of claim 1, further comprising a controller operatively coupled to a pressure compensated selector solenoid valve, the controller being programmed to activate and deactivate the pressure compensated selector solenoid valve to selectively control the the hydraulic circuit between the first operational mode and the second operational mode of the variable displacement pump.

8. A hydraulic control system for controlling a plurality of hydraulic implements, the hydraulic control system comprising:
a hydraulic circuit having a pressure compensated control valve a load sense control valve and a pressure compensated selector solenoid valve;
a relief valve fluidly coupled to the pressure compensated control valve;
a variable displacement pump fluidly coupled to the pressure compensated control valve and the load sense control valve;
a first hydraulic implement and a second hydraulic implement configured to receive a hydraulic fluid pumped through a hydraulic fluid line by the variable displacement pump; and
a controller operably and communicably coupled to the pressure compensated selector solenoid valve included in the hydraulic circuit, the controller being programmed to activate and deactivate the pressure compensated selector solenoid valve to selectably control the hydraulic circuit between a first operational mode and a second operational mode, wherein the controller selectably controls the pressure compensated solenoid valve to operate the hydraulic circuit in the first operational mode which positions the pressure compensated control valve into an open position such that the first hydraulic implement and the relief valve being fluidly coupled to the variable displacement pump.

9. The hydraulic control system of claim 8, wherein the first operational mode of the hydraulic circuit is a pressure compensated mode that operates the variable displacement pump at a fixed pressure setting, and the relief valve is configured to maintain a pre-determined pressure of the hydraulic fluid to actuate the first hydraulic implement such that the variable displacement pump supplies a constant pressure to the first hydraulic implement.

10. The hydraulic control system of claim 8, wherein the first hydraulic implement is a hydraulic actuated drill.

11. The hydraulic control system of claim 8, wherein the controller selectably controls the hydraulic circuit to operate in the second operational mode, the controller actuating the pressure compensated control valve into the closed position such that the variable displacement pump being fluidly coupled to the second hydraulic implement.

12. The hydraulic control system of claim 11, wherein the second operational mode of the hydraulic circuit is a load sense mode, and the load sense mode further comprises an adjustable pressure output of the variable displacement pump based on a sensed load of the second hydraulic implement.

13. The hydraulic control system of claim 12, wherein the second hydraulic implement includes at least one tram motor.

14. A machine having a hydraulic control system, the machine comprising:
a reservoir configured to store a hydraulic fluid;
a pressure compensated selector solenoid valve selectively operated to direct the hydraulic fluid;
a variable displacement pump coupled to the reservoir and the variable displacement pump configured to be selectable between a first operational mode and a second operational mode, and the variable displacement pump is configured to pump the hydraulic fluid through a hydraulic fluid line of the hydraulic control system;
a first hydraulic implement and a second hydraulic implement being fluidly coupled to the variable displacement pump through the hydraulic fluid line, and the hydraulic fluid supplied by the variable displacement pump through the hydraulic fluid line for actuation of the first hydraulic implement and the second hydraulic implement;
a pressure compensated control valve coupled to the hydraulic fluid line, the pressure compensated control valve having an open positon for fluidly connecting the first hydraulic implement and a relief valve to the variable displacement pump, an output of the relief valve being fluidly coupled to a return line of the reservoir, and the pressure compensated control valve having a closed position for fluidly isolating the relief valve from the variable displacement pump; and
a controller operably and communicably coupled to the pressure compensated selector solenoid valve, the controller being programmed to activate and deactivate the pressure compensated selector solenoid valve to selectably control the variable displacement pump between the first operational mode and the second operational mode, wherein the first operational mode is a pressure compensated mode that operates the variable displacement pump at a fixed pressure setting, and wherein the relief valve is configured to maintain a pre-determined pressure of the hydraulic fluid to actuate the first hydraulic implement such that the variable displacement pump supplies a constant pressure to the first hydraulic implement.

15. The machine of claim 14, wherein the first hydraulic implement is a hydraulic actuated drill.

16. The machine of claim 14, wherein the second operational mode of the hydraulic control system is a load sense mode, and the load sense mode further comprises an adjustable pressure output of the variable displacement pump based on a sensed load of the second hydraulic implement.

17. The machine of claim 16, wherein the second hydraulic implement includes at least one tram motor.

* * * * *